US012585759B2

(12) United States Patent
Kongara et al.

(10) Patent No.: US 12,585,759 B2
(45) Date of Patent: Mar. 24, 2026

(54) APPLICATION INTEGRITY VERIFICATION

(71) Applicant: Ivanti, Inc., South Jordan, UT (US)

(72) Inventors: Sarat Chandra Chowdary Kongara, San Jose, CA (US); Nagesh Ayyagari, Bangalore (IN); Fnu Pankaj Kumar, San Jose, CA (US); Vinoj Ebenezer Stanley, Seattle, WA (US); Praveen Kalla, Austin, TX (US)

(73) Assignee: Ivanti, Inc., South Jordan, UT (US)

( * ) Notice: Subject to any disclaimer, the term of this patent is extended or adjusted under 35 U.S.C. 154(b) by 109 days.

(21) Appl. No.: 17/845,674

(22) Filed: Jun. 21, 2022

(65) Prior Publication Data

US 2023/0004642 A1     Jan. 5, 2023

Related U.S. Application Data

(60) Provisional application No. 63/234,162, filed on Aug. 17, 2021.

(30) Foreign Application Priority Data

Jun. 30, 2021    (IN) .............................. 202111029480

(51) Int. Cl.
| | |
|---|---|
| *G06F 21/55* | (2013.01) |
| *G06F 21/56* | (2013.01) |
| *G06F 21/57* | (2013.01) |

(52) U.S. Cl.
CPC .......... *G06F 21/554* (2013.01); *G06F 21/568* (2013.01); *G06F 21/577* (2013.01); *G06F 2221/033* (2013.01)

(58) Field of Classification Search
CPC ...... G06F 21/554; G06F 21/568; G06F 21/55; G06F 21/56; G06F 21/57; G06F 2221/03; G06F 21/577; G06F 2221/033
See application file for complete search history.

(56) References Cited

U.S. PATENT DOCUMENTS

| | | | | |
|---|---|---|---|---|
| 9,939,475 B2 * | 4/2018 | Collins | .......................... | Plt./190 |
| 2008/0271019 A1 * | 10/2008 | Stratton | ................ | G06F 21/577 718/1 |
| 2020/0387611 A1 * | 12/2020 | Yao | ........................ | G06F 21/572 |

(Continued)

FOREIGN PATENT DOCUMENTS

| | | | | | |
|---|---|---|---|---|---|
| CN | 105302803 A | * | 2/2016 | ............. | G06F 21/51 |
| WO | WO-9939475 A1 | * | 8/1999 | ........... | G06F 21/572 |

*Primary Examiner* — Catherine Thiaw
*Assistant Examiner* — Daniel Elahian

(57) ABSTRACT

A method of application integrity verification and remediation includes scanning an appliance to identify installed program files associated with an application under analysis deployed at the appliance. The method includes computing a hash value of a first installed file of the installed program files. The method includes determining whether the first installed file exists in vendor program files of the application that are maintained separate from the installed program files. The method includes fetching a hash value of a first vendor file of the vendor program files. The first vendor file corresponds to the first installed file. Responsive to the fetched hash value differing from the computed hash value, the method includes classifying the first installed program file as a compromised file and remediating the compromised file at the network appliance.

16 Claims, 8 Drawing Sheets

(56) References Cited

U.S. PATENT DOCUMENTS

| | | | |
|---|---|---|---|
| 2020/0401693 A1* | 12/2020 | Yamato | ................. G06F 9/4406 |
| 2023/0254143 A1* | 8/2023 | Yu | ........................... G06F 21/79 |
| | | | 713/189 |

* cited by examiner

500

Hash Comparison Module 206

502

| Inst_Filename_B | 302B | ⇒ | Vdn_Filename_B | 306B |
| Inst_Filename_n | 302C | ⇒ | Vdn_Filename_n | 306C |

| Inst_Filename_B | 302B | Inst_Hash_B | 304B |
| Inst_Filename_n | 302C | Inst_Hash_n | 304C |

⇩

| Vdn_Filename_B | 306B | Vdn_Hash_B | 308B |
| Vdn_Filename_n | 306C | Vdn_Hash_n | 308C |

504

506

| Inst_Hash_B | 304B | ?<br>= | Vdn_Hash_B | 308B |

| Inst_Hash_n | 304C | ?<br>= | Vdn_Hash_n | 308C |

=

| Inst_Filename_n | 302C |

Verified

508

≠

| Inst_Filename_B | 302B |

Unauthorized Or Compromised
Program File(s) 210

Archive
212

APPLICATION INTEGRITY VERIFICATION

CROSS-REFERENCE TO RELATED APPLICATIONS

This application claims the benefit of and priority to U.S. Prov. Pat. No. 63/234,162, filed Aug. 17, 2021, and Indian Prov. Pat. No. 202111029480, filed Jun. 30, 2021. This application incorporates the disclosures of these applications by reference in their entireties.

FIELD

The embodiments described in this disclosure are related to application integrity verification on network appliances.

BACKGROUND

Software applications are generally associated with program files. The program files may be supplied by a vendor to one or more client devices via network download or via another transfer such as sales of storage medium on which the program files are stored. The program files might include multiple files (e.g., hundreds of program files) of different types that work together to enable the functionality of the software application. The vendor develops the program files and may periodically update one or more of the program files enable additional functions and/or to remove deficiencies.

The program files may be stored locally on the client devices. For instance, the program files may be loaded onto a smart phone of a client where they are maintained separately. For instance, in most circumstances, the program files installed on the client device are retained at the client device. Conventionally, the vendor may not interface or review the program files except to perform the periodic updates.

In some instances, the program files may introduce a vulnerability. The vulnerability may pose a threat to security of the client device and also to a network in which the client device is included. For instance, a malicious actor may gain access to one of the program files on the client devices and modify the accessed program file. A modification to the accessed program files may alter a function of the software application. For example, the malicious action may disable a security feature, which may allow the malicious actor to assume a role of an authorized client, enable access to files on a protected network of the client device, add an additional program file, etc.

Accordingly, a need exists for a solution that verifies integrity of the program files. Specifically, there is a need to ensure that the program files at the client device have not been accessed, modified, appended, or deleted. Additionally, to effectively perform a verification, there is a need to perform an analysis of the program files at the client device without a malicious actor becoming aware of the analysis.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of the invention, an embodiment includes a method of software application integrity verification and vulnerability remediation. The method may be performed under various out-of-band operating conditions such as during a secured boot operation, responsive to a clock signal, while the software application is running on a network appliance, or combinations thereof. The method may include reading an integrity file. The integrity file may include vendor program files for a software application under analysis. The method may include populating a first hash map. The method may include scanning a network appliance to identify installed program files on the network appliance that are associated with the application under analysis. The method may include computing a hash value of one or more of the installed program files. It may be determined whether a first installed program file of the installed program files exists in the first hash map. The method may include classifying the first file as an unauthorized file responsive to the first installed program file not existing in the first hash map. The method may include remediating the unauthorized file at the network appliance. The method may include adding the unauthorized file to an archive and the archive may be encrypted. Responsive to the first installed program file existing in the first hash map, the method may include fetching a hash value from the first hash map. It may be determined whether the fetched hash value matches the computed hash value. The method may include classifying the first file as a compromised file when the computed hash value differs from the fetched hash value. The method may include remediating the compromised file. For instance, complaint program files may replace the installed program files or may be used to perform a factory reset of the application under analysis. Installation of the compliant program files reduces or removes the vulnerability introduced by the compromised file. The method may include classifying the first file as an uncompromised or verified program file when the computed hash value is the same as the fetched hash value. For instance, when the computed hash value matches the fetched hash value, it may indicate that the contents of program files are equivalent and unmodified by a malicious actor. Thus, these program files may pose little risk at introducing a security threat to the system.

An additional aspect of an embodiment includes a non-transitory computer-readable medium having encoded therein programming code executable by one or more processors to perform or control performance at least a portion of the method described above.

Yet another aspect of an embodiment includes a network appliance. The network appliance may include one or more processors and a non-transitory computer-readable medium. The non-transitory computer-readable medium has encoded therein programming code executable by the one or more processors to perform or control performance of one or more of the operations of the methods described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Figure 1:
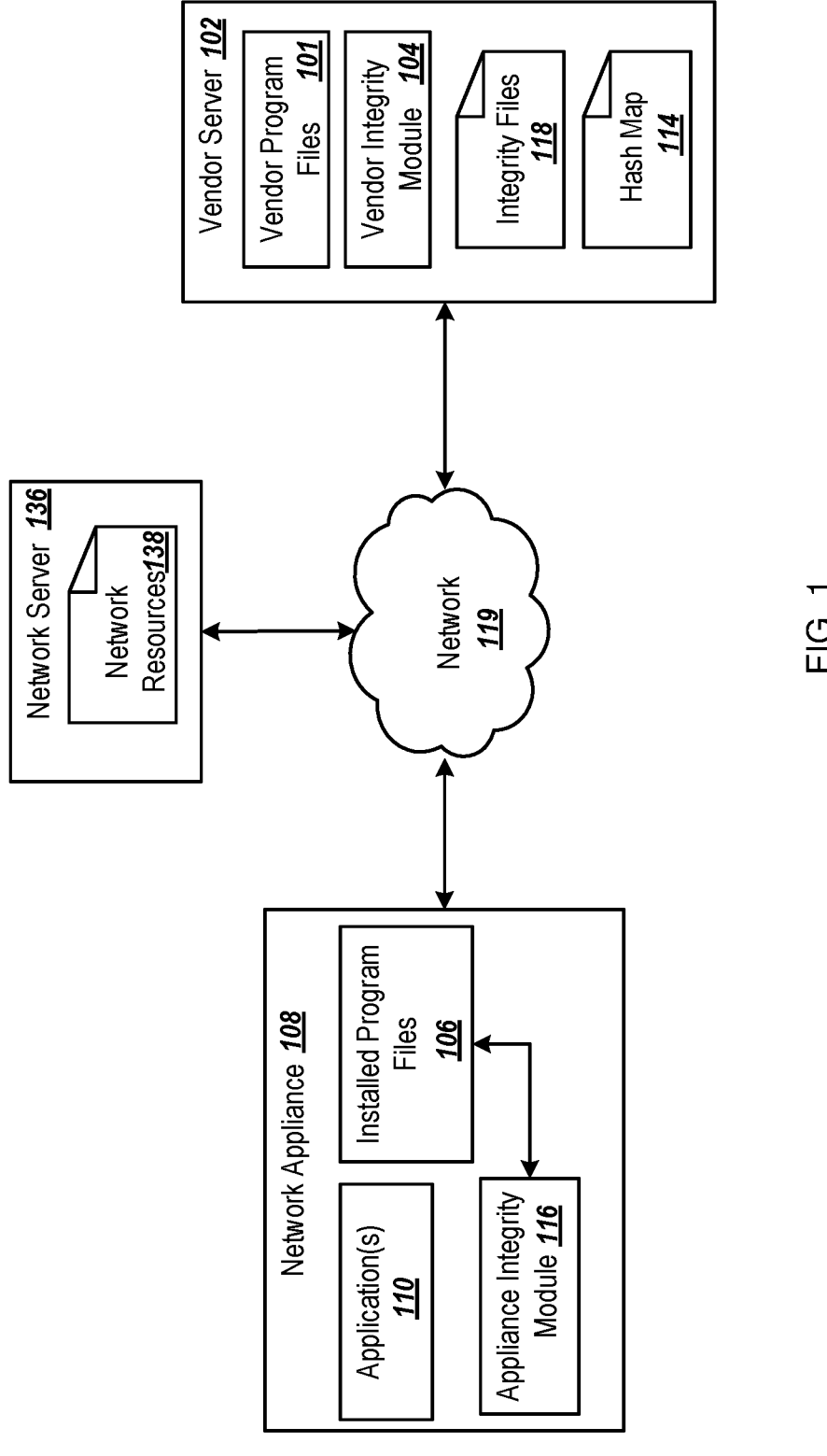
FIG. 1 depicts a block diagram of an example operating environment in which some embodiments described in the present disclosure may be implemented.

The embodiments described in this disclosure are related to systems and methods of verifying integrity of software applications in computer networks and remediating any identified vulnerabilities. Some embodiments are directed to performance of an integrity analysis of program files on network appliance. The integrity analysis is configured to detect unauthorized program files on the network appliance and compromised or modified program files on the network appliance. In these embodiments, detected unauthorized program files or compromised program files are remediated at the network appliance.

In some embodiments, the integrity analysis is based on a comparison between program files of a software application that are installed at the network appliance and corresponding program files that are maintained separately from the network appliance. The program files installed at the network appliance are referred to as "installed program files." The program files maintained separately from the network appliance are referred to as "vendor program files."

Each of the installed program files of an application under analysis is checked. For instance, some embodiments of the present disclosure check to ensure that each of the installed program files are not unauthorized program files (e.g., additional, non-vendor program files) and to ensure that the installed program files are not compromised program files (e.g., modified by an unauthorized party). The verification of the installed program files verify that the operational application has not be compromised and is likely not introducing a security vulnerability into the network appliance of a network including the network appliance.

Additionally, in some embodiments the integrity analysis is conducted out-of-band. As used herein, the term out-of-band indicates that performance of the integrity analysis does not interfere with operation of the application and may be conducted without a malicious party being able to detect it.

The systems and methods described in the present disclosure may provide an improvement to conventional network security processes. In particular, the verification of applications in conventional system generally includes verification of cryptographic signatures on program files. However, many of the program files (e.g., data files and libraries) may not include cryptographic signatures, leaving these program files open to unauthorized access and modifications. Moreover, verification of cryptographic signatures may involve exchange of keys and an allocation of time.

In contrast, some embodiments described herein verify that each of the installed program files is appropriately included in the installed program files and that each of the installed program files has not been modified. To verify that the each of the installed program files is appropriately included in the installed program files, some embodiments may confirm that each installed program file exists in list or map of vendor program files. If any of the installed program files do not exist in the list or map of the vendor program files, then it is classified as an unauthorized program file. The unauthorized program file may introduce a security threat to the network appliance by enabling additional/unauthorized functions of the application under analysis.

Some embodiments also perform a second check of the authorized program files (e.g., those installed program files that do exist in the vendor program files). For example, in some embodiments, hash values of each of the installed program files are compared to hash values of a corresponding file of the vendor program files. If the hash values for a particular installed vendor file differs from the hash value for a corresponding vendor program file, then the particular installed vendor file is classified as a compromised program file. Such differences are indicative of a modification to the installed program files, which is likely unauthorized. In these embodiments, the unauthorized program files and the compromised program files may be remediated by preforming a factory reset of the application under analysis or otherwise replace or removing the unauthorized program files or the compromised program files.

These and other embodiments are described with reference to the appended Figures in which like item numbers indicate like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

FIG. 1 illustrates a block diagram of an example operating environment 100 in which one or more embodiments of software application integrity assurance systems and methods may be implemented. In the operating environment 100 of FIG. 1, a vendor server 102 may be communicative coupled to a network appliance 108 via a network 119. The network appliance 108 has one or more applications 110 installed locally. The vendor server 102 may be configured to provide and/or support one or more of the applications 110. Associated with the applications 110 may be one or more installed program files 106. The installed program files 106 are either present on the network appliance 108 or locally available to the network appliance 108.

The installed program files 106 may be subject to unauthorized access and/or modification. For instance, a malicious actor may have access to source code and/or update schedules which may enable access to one or more of the installed program files 106 at the network appliance 108. After the malicious actor accesses the installed program files 106, the malicious actor may modify them, which may change the function of the applications 110. For example, the malicious actor may make modifications to the installed program files 106 to access network resources 138 on a network server 136, to write files to the network server 136, to enable execution of arbitrary scripts and commands, to disable one or more security features, and the like.

In the operating environment 100, an appliance integrity module 116 and/or a vendor integrity module 104 (collectively or alternatively, integrity modules 104/116) may be implemented to reduce or eliminate the security vulnerability introduced by the installed program files 106. In particular, the integrity modules 104/116 may be configured to perform an integrity analysis of the installed program files 106. The integrity analysis enables identification of inconsistencies and differences in the installed program files 106 that are indicative of program files that have been accessed, created, deleted, modified, or otherwise compromised.

In addition, in at least some embodiments, the integrity modules 104/106 may perform the integrity analysis out-of-band. Accordingly, in these and other embodiments, a user of the network appliance 108 and/or a malicious actor may be unaware of the integrity analysis, which may prevent escalation of a security breach.

In the depicted embodiment, the integrity modules 104/116 may base the integrity analysis on a comparison between the installed program files 106 and vendor program files 101 or representations or derivatives thereof. In these embodiments, the vendor program files 101 are versions of the installed program files 106 that are maintained separate from the network appliance 108. For instance, the vendor program files 101 may be maintained at the vendor server 102 or on the appliance integrity module 116. Accordingly, the vendor program files 101 are not subject to unauthorized access and modification described above. Thus, in these and other embodiments, identification of a security threat in the installed program files 106 includes identifying one or more of the installed program files 106 that differ from a corresponding file of the vendor program files 101, identification of one of the installed program files 106 that do not appear in the vendor program files 101, identification of one of the vendor program files 101 that is missing from the installed program files 106, or combinations thereof.

In some embodiments, the integrity analysis is at least partially based on hash values of content of the installed program files 106 and the vendor program files 101. In these embodiments, the integrity modules 104/116 may be configured to perform a hash operation on the vendor program files 101 and the installed program files 106. The hash values of each of the vendor program files 101 is compared to a hash value of a corresponding program file of the installed program files 106. Differences in the hash values are indicative of a difference in the content of the installed program files 106, which may further indicate that the installed program file 106 is compromised.

Additionally, in some embodiments, one or more hash maps 114 may be generated. The hash maps 114 may include a list of the vendor program files 101 and/or hash values of the vendor program files 101. In these and other embodiments, the integrity modules 104/116 may also verify that each of the installed program files 106 is included in the hash map 114 for the application 110 and that all of the vendor program files 101 for the application 110 are included in the installed program files 106. Any differences between the files listed in the hash maps 114 and the files of the installed program files 106 may be indicative of security issue at the network appliance 108.

The integrity modules 104/116 may be configured to mitigate any compromised program files identified during the integrity analysis and to report such program files. Thus, the embodiments of the present disclosure provide a technical solution to a security vulnerability introduced by the installed program files 106 at the network appliance 108. As will be described more elsewhere herein, the integrity module 104/116 are configured to perform the integrity analysis of the installed program files 106, which enables detection of any unauthorized program files, any compromised program files, and any deleted program files. These unauthorized, compromised, and deleted program files may be mitigated and the network appliance 108 may be restored to normal operation.

Moreover, the integrity analysis may be conducted out-of-band, which limits knowledge of the analysis by a malicious actor. Thus, any exploited security vulnerability or a security breach may be identified and resolved before the malicious actor is aware or takes actions to escalate the situation.

As introduced above, the operating environment 100 may include the network appliance 108, the network server 136, and the vendor server 102 that are configured to communicate data and information via the network 119. In the following paragraphs, some additional details of these components (102, 108, and 136) are provided.

The network 119 may include any communication network configured for communication of signals between the components (e.g., 108, 136, and 102) of the operating environment 100. The network 119 may be wired or wireless. The network 119 may have configurations including a star configuration, a token ring configuration, or another suitable configuration. Furthermore, the network 119 may include a local area network (LAN), a wide area network (WAN) (e.g., the Internet), and/or other interconnected data paths across which multiple devices may communicate. In some embodiments, the network 119 may include a peer-to-peer network. The network 119 may also be coupled to or include portions of a telecommunications network that may enable communication of data in a variety of different communication protocols.

In some embodiments, the network 119 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 119 may include data communicated via short messaging service (SMS), multimedia messaging service (MMS), hypertext transfer protocol (HTTP), direct data connection, wireless application protocol (WAP), or any other protocol that may be implemented in the components of the operating environment 100.

The network server 136 may include a hardware-based computer system that may be communicatively connected to the network appliance 108 via the network 119. The network server 136 may be included in a managed network such as an enterprise network with the network appliance 108. For instance, the application 110 may be configured to provide secured access to the network resources 138 hosted on the network server 136. The network resources 138 might include data files with sensitive information, an enterprise-specific application (e.g., an email system or financial system), etc. Accordingly, in these and other embodiments, a compromised program file in the installed program files 106 may enable a malicious actor to access the network resources 138 on the network server 136. Implementation of the integrity analysis of the installed program files 106 may therefore eliminate the compromised program file and help secure the network resources 138 of the managed network or the enterprise network.

Although not depicted in FIG. 1, a managed network including the network server 136 and the network appliance 108 may also include additional network appliances 108 and/or additional network servers 136. For instance, the managed network might include thousands of additional network appliances which may each include the applications 110, the installed program files 106, the appliance integrity module 116 (or access the vendor integrity module 104), or combinations thereof. In these embodiments, one or more or all of the additional network appliances 108 may perform an integrity analysis of their installed program files 106.

Performance of the integrity analysis may occur responsive to a clock signal. For instance, the performance of the integrity analysis may be performed according to a schedule (e.g., every day, every week, every time one or more of the applications 110 are launched, or another suitable schedule).

Additionally, the network server 136 may include an instance of the installed program files 106, the applications 110, and the appliance integrity module 116. The appliance integrity module 116 at the network server 136 may perform an integrity analysis as described in the present disclosure. Some embodiments of the operating environment 100 may omit the network server 136 or may include multiple network servers 136, one or more of which may have network resources 138.

The vendor server 102 includes a hardware-based computer system configured to communicate data and information with the network appliance 108 via the network 119. In general, the vendor server 102 may be associated with a vendor or a proprietor that provides or maintains one or more of the applications 110. In addition, the vendor may generate and provide the installed program files 106, the appliance integrity module 116, the vendor program files 101, the vendor integrity module 104, integrity files 118, the hash maps 114, or any combination thereof.

In some embodiments, a vendor associated with the vendor server 102 might sell the applications 110 to a user of the network appliance 108. For the applications 110 to function, the vendor server 102 may communicate or make available program files to the network appliance 108. When the program files leave the vendor server 102, these program files may be characterized as the vendor program files 101. After the program files are loaded on the network appliance 108, the program files may be characterized as the installed program files 106.

The vendor server 102 may include the vendor integrity module 104. The vendor integrity module 104 may be configured to generate integrity files 118 and the hash maps 114 in addition to performance of the integrity analysis and remediation described below. The integrity files 118 and the hash maps 114 may each be based on the vendor program files 101 or some portion thereof. For instance, the integrity files 118 may include one or more of the vendor program files 101. The integrity files 118 that may be communicated to or made available to the network appliance 108 to populate the hash map 114 and/or to remediate identification of a compromised file at the network appliance 108. The integrity files 118 may include uncompromised versions of the identified compromised file(s) or information related thereto. In some embodiments, the integrity files 118 may include all of vendor program files 101 and/or hash values of all of the vendor program files 101.

The hash maps 114, which may be generated from the integrity files 118, may include one or more lists of information related to the vendor program files 101 and the installed program files 106. For instance, the hash maps 114 may include a list of each and every program files included in the vendor program files 101. Additionally, the hash maps 114 may include a hash value of the vendor program files 101. For instance, a hash value of each of the vendor program files 101 may be computed using an SHA-256 hash function or another suitable hash function. The hash values of each of the vendor program files 101 may be listed in the hash maps 114. The hash values may be combined and correlated to the list of the program files of the vendor program files 101. For instance, the hash values may be listed with (e.g., in an associated row or column) a name or an identifier of each of the vendor program files 101.

The hash maps 114 generated by the vendor server 102 may provide a controlled or verified listing of what should and should not be included in the installed program files 106. In particular, the hash maps 114 may include a list of each program file that should be included in the installed program files 106. Additionally, the hash values are computed based on the content of the vendor program files 101. Thus, the hash values represent the proper content of installed program files 106.

The hash maps 114 may be communicated to the network appliance 108, may be included in the appliance integrity module 116, may be accessible on the vendor server 102, or any combination thereof. For instance, the network appliance 108 may have the hash maps 114 for the applications 110 stored on a local memory which may be accessed during an integrity analysis. Additionally or alternatively, the appliance integrity module 116 may be a self-contained tool that is downloaded to the network appliance 108. The appliance integrity module 116 may have stored on it the hash map(s) 114 for the application(s) 110. Additionally still, the appliance integrity module 116 or the vendor integrity module 104 may perform an integrity analysis of the installed program files 106. During the analysis, the hash map 114 may be accessed remotely. In some embodiments, the hash maps 114 may be formatted according to a bill of materials (BOM) file format. The BOM file format enables a listing of information and data related to one another. Some examples of a BOM file are provided elsewhere in the present disclosure.

The network appliance 108 includes a hardware-based computer device. The network appliance 108 is configured to interface with one or more other computer devices such as the network server 136 via the network 119. In general, the network appliance 108 may include any computing device that runs the applications 110 and stores or can enable access to the installed program files 106. In some embodiments, the network appliance 108 includes a device associated with a user for regular use (e.g., a mobile device associated with an employee). In other embodiments, the network appliance 108 may be a network component (e.g., a printer, router, hub, gateway, etc.) or a computer storage component.

The network appliance 108 may be included in a customer or a client environment. In these and other embodiments, the customer or client environment may include a particular system of hardware, software, network, and data structures that are developed and implemented for a particular entity such as an enterprise. Inclusion of the network appliance 108 in the customer environment may indicate that the network appliance 108 has a particular set of applications 110, communicates via particular network communication protocols, operates according to a standard or set security policy, etc.

The network appliance 108 of FIG. 1 includes the applications 110 and the installed program files 106. The installed program files 106 are associated with the applications 110. In particular, the installed program files 106 (and the vendor program files 101) may operate to enable the functionality of the applications 110 on the network appliance 108. The installed program files 106 may include executable files which may store code associated with the applications 110.

In some instance, the installed program files 106 may include thousands of files (e.g., 20 thousand) associated with one of the applications 110. The integrity analysis may be conducted for one of the applications 110 at a time. In these embodiments, all of the installed program files 106 associated with the application 110 under analysis may be reviewed.

As described above, the applications 110 are vendor-supplied software applications that may run in a customer or client environment such as a managed network or an enterprise network. The applications 110 may be encrypted application. The applications 110 may be configured to interface with any operating systems such as Linux®, Microsoft®, macOS®, etc.

The network appliance 108 may also include the appliance integrity module 116. As discussed above, the integrity module 104/116 may be configured to perform an integrity analysis of the installed program files 106. The integrity analysis of the installed program files 106 is implemented to identify compromised files and unauthorized files among the installed program files 106. For instance, the integrity analysis may be performed to identify program files that have been modified without authorization, program files that have been added by an unauthorized actor, a deleted program file, or any combination thereof. Additionally, the integrity modules 104/116 may be configured to mitigate or remediate any identified compromised and unauthorized program files and to report such program files such that these program files may be further analyzed.

In some embodiments, the integrity module 104/116 may access the integrity files 118 or a hash map 114. To access the integrity files 118 or a hash map 114 the integrity module 104/116 may communicate a request to a vendor server requesting the existing catalog file; or receive at the network appliance 108, a validation package from the vendor server 102, that includes programming instructions to execute some or all of the integrity analysis as well as the integrity files 118 and/or a hash map 114.

The integrity module 104/116 can either populate a vendor hash map using the integrity files 118 or use the hash map 114 for the integrity analysis. For instance, the vendor hash map and/or integrity files 118 may include a directory of vendor program files 101 associated with the application 110 under analysis and computed hash values of each of the vendor program files 101. The computed hash values of each of the vendor program files 101 are representative of content of the vendor program files 101.

The integrity module 104/116 is configured to identify the installed program files 106 associated with one or more of the applications 110 under analysis stored on the network appliance 108. The integrity module 104/116 may then scan the installed program files 106. In some instance, the integrity module 104/116 may scan the installed program files 106 out-of-band such that operation of the applications 110 is not interrupted or during a secured boot sequence as the applications 110 are launched.

The integrity module 104/116 may compute a hash value of each of the installed program files 106. In some embodiments, the hash values may be computed responsive to a check that one of the installed program files 106 exist in the vendor hash map. The hash values of each installed program file 106 are representative of the content of each of the installed program files 106. In other embodiments, after the installed program files 106 are identified, the integrity module 104/116 may compute the hash values. In these and other embodiments, the integrity module 104/116 may compute an installed hash map of the installed program files 106. The installed hash map includes a directory of the installed program files 106 and corresponding computed hash values of each of the installed program files 106.

As mentioned above, the integrity module 104/116 may determine whether there are unauthorized program files among the installed program files 106 (e.g., a program file included in the installed program files 106 and not found in the vendor hash map.). Moreover, the integrity module 104/116 may determine whether one of the vendor program files 101 have been removed (e.g., a program file included in the vendor hash map and not in the installed program files 106).

The integrity module 104/116 may individually compare the computed hash values of the installed program files 106 to the computed hash values of the vendor program files 101. The integrity module 104/116 may identify any compromised program file of the installed program files 106 based on a difference between computed hash values of the installed program files 106 and the computed hash values of a corresponding vendor program files 101. The identified difference indicates a difference in content, which may further indicate an unauthorized modification by a malicious actor.

The integrity module 104/116 may be configured to remediate the installed program files 106. The remediation of the installed program files 106 may include replacing at least the compromised program files with a corresponding one of the integrity files 118. In some embodiments, the remediation may include replacing two or more or all of the installed program files 106 with the integrity files 118. For instance, in these embodiments, the presence of one compromised program file might be indicative of a larger problem. Accordingly, all of the installed program files 106 or all of the installed program files 106 of a type, etc. may be replaced. The replacement of all the installed program files 106 may be tantamount to a factory reset, which may return the application(s) 110 to a known complaint version of thereof.

The integrity module 104/116 may also be configured to collect data related to the compromised program file or to generate an artifact of the compromised program file. Th integrity modules 104/116 may then preserve the data related to the compromised program file and the compromised program file for further analysis. The integrity module 104/116 may also communicate information related to the compromised program file to the vendor server 102 or another entity that may track or investigate the security threat.

The integrity modules 104/116 are described together in the foregoing paragraphs. It may be understood with the benefit of this disclosure that the appliance integrity module 116, the vendor integrity module 104, or a combination of the appliance integrity module 116 and the vendor integrity module 104 may perform some or all of the operations of the integrity analysis.

In the operating environment 100, the integrity analysis may be performed while the applications 110 are running. Accordingly, the integrity analysis may be performed without interfering with normal operation of the applications

110. Performance of the integrity analysis while the applications 110 are running enables an analysis without letting a malicious actor know that the integrity analysis or remediation operations are underway.

Additionally, in some embodiments, the integrity modules 104/116 may be implemented in whole or in part relative to one or more of the applications 110 during a secure boot. In conventional secure boots, the network appliance 108 may verify signatures of the applications 110 involved in the system boot (e.g., bootloaders, utilities, etc.). In these conventional systems, a firmware may verify the signature on the applications 110 prior to the OS launching. If the signatures cannot be verified, the secure boot firmware prohibits execution of the applications 110. Similarly, in embodiments of the integrity modules 104/116 executed during a secure boot, the integrity analysis may be run during the OS launching. The integrity analysis may identify compromised or unauthorized program files and prohibit launch of the applications 110 associated therewith. Additionally or alternatively, the integrity modules 104/116 may remediate the compromised and unauthorized program files during the secure boot and implement the factory reset of the compromised application 110. Following the factory reset, the integrity modules 104/116 may allow completion of the boot sequence. In these embodiments, the integrity modules 104/116 may perform the integrity analysis and any necessary remediations without the user being aware of an issue.

The applications 110, the installed program files 106, the appliance integrity module 116, the vendor program files 101, the vendor integrity module 104, and the integrity files 118 (collectively, modules), and components thereof may be implemented using hardware including a processor, a microprocessor (e.g., to perform or control performance of one or more operations), a field-programmable gate array (FPGA), or an application-specific integrated circuit (ASIC). In some other instances, the modules and components thereof may be implemented using a combination of hardware and software. Implementation in software may include rapid activation and deactivation of one or more transistors or transistor elements such as may be included in hardware of a computing system (e.g., the network appliance 108, the network server 136, or the vendor server 102 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more network appliances 108, one or more network servers 136, one or more vendor servers, one or more networks 119, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 2:
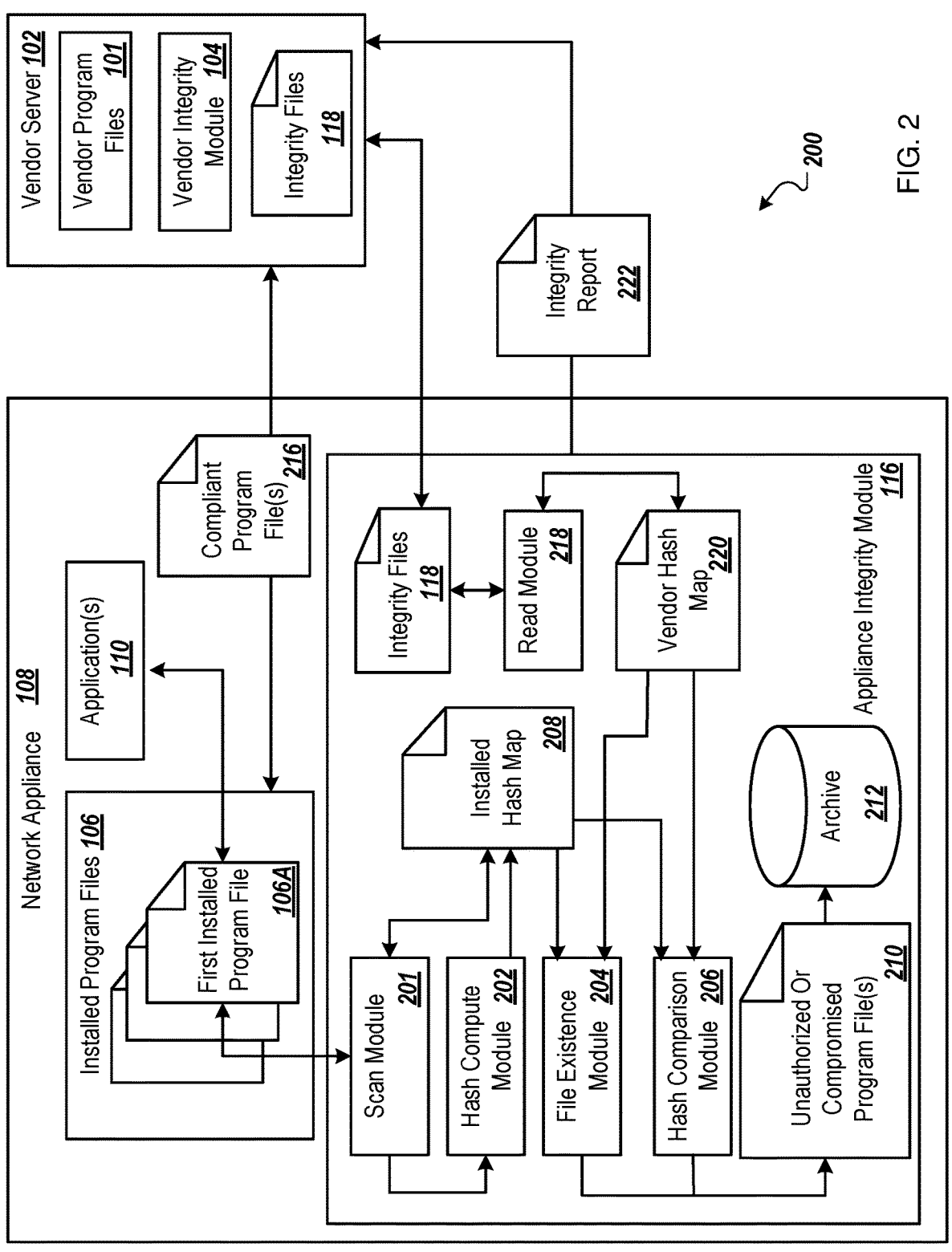
FIG. 2 depicts a block diagram of an example integrity analysis process (hereinafter, "integrity process") that may be implemented in the operating environment of FIG. 1.

FIG. 2 depicts a block diagram of an example integrity analysis process (hereinafter, "integrity process") 200 that may be implemented in the operating environment 100 of FIG. 1. In FIG. 2, the integrity process 200 is shown relative to some of the components (108, 102, 116, 110, 106, etc.) of FIG. 1. The description of these components is not repeated with reference to FIG. 2. The network 119 is not depicted in FIG. 2. However, it may be understood with the benefit of this disclosure that communicate in the integrity process 200 may be via a communication network such as the network 119 of FIG. 1.

The integrity process 200 is depicted in FIG. 2 as being implemented by the network appliance 108 by the appliance integrity module 116. However, one or more operations of the integrity process 200 may be implemented at the vendor server 102 by the vendor integrity module 104. Additionally, the integrity process 200 is depicted with some operations being performed by the vendor server 102. In some embodiments, the integrity process 200 may be fully or substantially (e.g., all but reporting steps) implemented on the network appliance 108 without communicating or otherwise interacting with the vendor server 102.

In FIG. 2, the appliance integrity module 116 may include a scan module 201, a hash compute module 202, a file existence module 204, a hash comparison module 206, a read module 218, and an archive 212. The integrity process 200 may begin with the read module 218 reading the integrity files 118. In some instances or for some applications 110, the integrity files 118 are stored locally such as in the appliance integrity module 116 or elsewhere on the network appliance 108. Additionally, in some instances or for some applications 110 the read module 218 may communicate with the vendor server 102 to remotely access the integrity files 118.

The read module 218 may populate a vendor hash map 220 based on the contents of the integrity files 118. In some embodiments, the integrity files 118 include a list of the vendor program files 101 and hash values computed based on the vendor program files 101. In these and other embodiments, the vendor hash map 220 may be populated with the list of the vendor program files 101 and the hash values associated with each of the vendor program files 101.

In other embodiments, the integrity files 118 may not include the hash values and may instead include the vendor program files 101. In these and other embodiments, the read module 218 may compute hash values of the vendor program files 101. For instance, the read module 218 may execute a hash function on the content of the vendor program files 101. The read module 218 may then populate the vendor hash map 220 with the computed hash values along with a list of the vendor program files 101, which may be identified by a filename or another suitable file identifier. Some additional details of the operations of the read module 218 are described with reference to FIG. 3.

The scan module 201 may be configured to scan the network appliance 108. The scan may be directed to a repository where program files for the applications 110 are stored on the network appliance 108. The scan module 201 may then identify all of the installed program files 106 associated with one or more of the applications 110.

In some embodiments, the scan module 201 may generate an installed hash map 208 in some embodiments. Some additional details of an example process of generating the installed hash map 208 are provided with reference to FIG. 3. The installed hash map 208 may include a list of the installed program files 106. For instance, the scan module 201 may access the installed program files 106 to pull an identifier of each of the installed program files 106. The identifiers may be included in the installed hash map 208. The scan module 201 may then communicate the installed program files 106 to the hash compute module 202. The hash compute module 202 may then compute a hash value of each of the installed program files 106, which may be added to the installed hash map 208.

In some embodiments, the installed program files 106 may be evaluated one at a time. For instance, a first installed program file 106A may be analyzed, followed by a second installed program file, etc. In these and other embodiments, the installed hash map 208 may not be generated or may only include a list or directory of the installed program files 106. In the following paragraphs, the analysis of each of the installed program files 106 is described, the information for the analysis may be stored in the installed hash map 208 or may be generated on the fly during the analysis.

The file existence module 204 may be configured to determine whether the installed program files 106 exists in the vendor hash map 220. This step checks the installed program files 106 against the directory of vendor program files 101. The file existence module 204 may perform the operation file-by-file such that the first installed program file 106A is evaluated followed by each of the installed program files 106.

Responsive to the first installed program file 106A not existing in the vendor hash map 220, the file existence module 204 may classify the first installed program file 106A as an unauthorized program file 210. The appliance integrity module 116 may remediate the security threat introduced by the unauthorized program file 210. For instance, responsive to detection of the unauthorized program file 210, the vendor server 102 may communicate compliant program files 216 to the network appliance 108. The compliant program files 216 may replace the installed program files 106 on the network appliance 108, which removes the vulnerability introduced by the unauthorized program file 210. The unauthorized program file 210 or an artifact thereof may be communicated to the archive 212, where it may be encrypted. Additionally, the appliance integrity module 116 may communicate an integrity report 222 to the vendor server 102 to provide information regarding the potential vulnerability.

Responsive to the first installed program file 106A existing in the vendor hash map 220, the file existence module 204 may communicate the first installed program file 106A to the hash comparison module 206. The hash comparison module 206 may determine which of the vendor program files 101 corresponds to the first installed program file 106A. The hash comparison module may then compare a hash value of the first installed program file 106A to a hash value of the vendor program file 101 that corresponds to the first installed program file 106A. The hash value of the vendor program file 101 that corresponds to the first installed program file 106A may be fetched from the vendor hash map 220. The hash value of the first installed program file 106A is computed by the hash compute module 202 and may be stored in the installed hash map 208.

The hash comparison module 206 may determine whether the fetched hash value matches the computed hash value. Responsive to the computed hash value being the same as the fetched hash value, the first installed program file 106A may be verified as being trustworthy. The appliance integrity module 116 may communicate the integrity report 222 to the vendor server 102 that reflects the verified program files.

Alternatively, when the computed hash value differs from the fetched hash value, it indicates that the contents of first installed program file 106A has been modified. Modification to the first installed program file 106A may indicate that a malicious actor has exploited a vulnerability on the network appliance 108, which may further indicate security breach. The hash comparison module 206 may then classify the first installed program file 106A as a compromised program file 210.

The hash comparison module 206 may remediate the security threat introduced by the compromised program file 210. For instance, responsive to detection of the compromised program file 210, the vendor server 102 may communicate the compliant program files 216 to the network appliance 108 to replace the installed program files 106 on the network appliance 108. Installation of the compliant program files 216 reduces or removes the vulnerability introduced by the compromised program file 210. The compromised program file 210 or an artifact thereof may be communicated to the archive 212, where it may be encrypted. Additionally, the appliance integrity module 116 may communicate the integrity report 222 to the vendor server 102 to provide information regarding the potential vulnerability.

In some embodiments, the appliance integrity module 116 may also perform an operation that ensures each of the vendor program files 101 in the vendor hash map 220 are included in the installed program files 106 of the network appliance 108. In these and other embodiments, as the installed program files 106 are evaluated, the corresponding vendor program file 101 may be noted. After all the installed program files 106 are evaluated, the appliance integrity module 116 may determine whether there are any vendor program files 101 left of in the vendor hash map 220. Responsive to one of the installed program files 106 being missing from the system, the appliance integrity module 116 may include remediating the system by performing a factory reset or adding the missing program file to the system.

Figure 3:
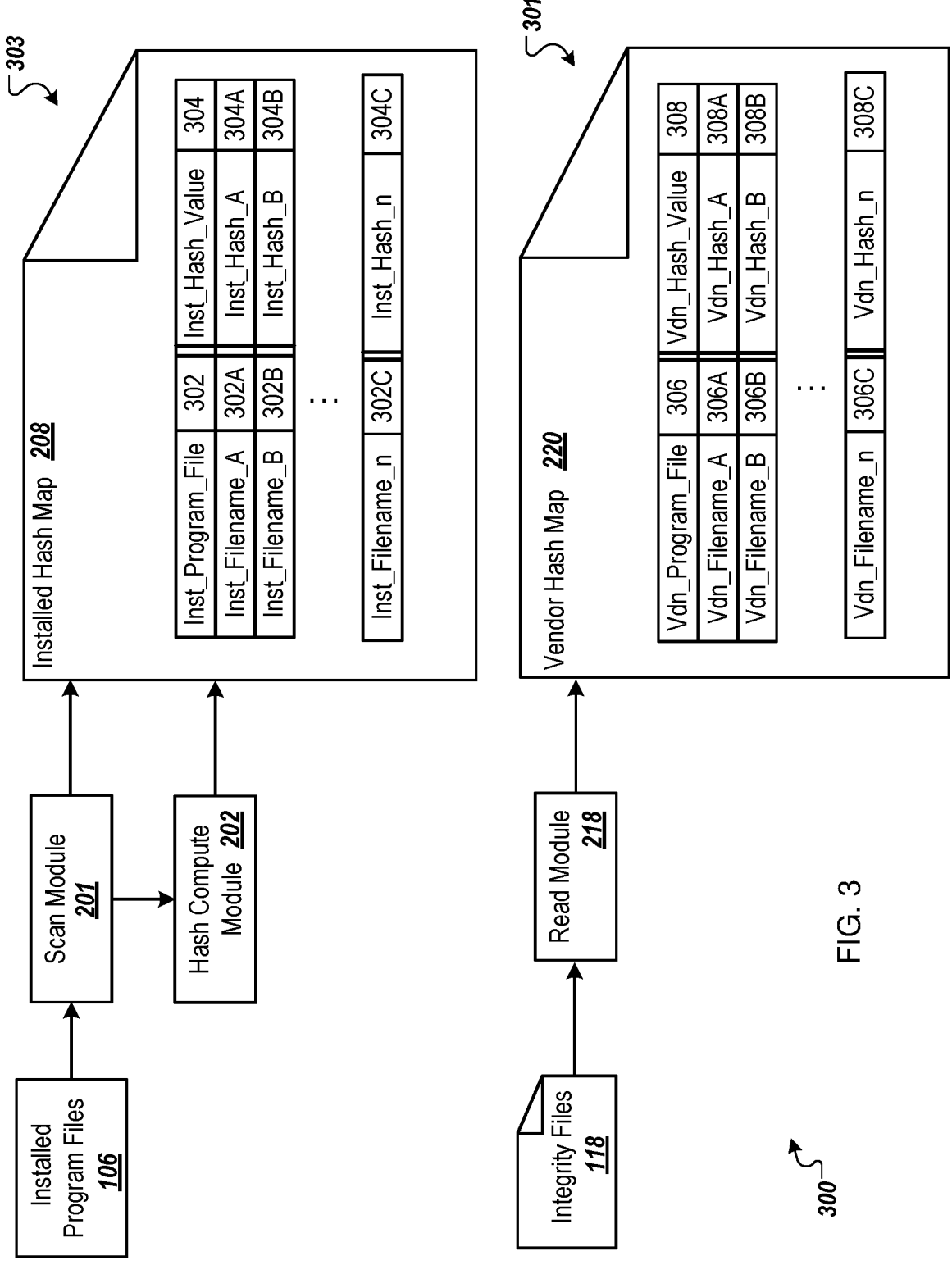
FIG. 3 depicts an example map generation process that may be implemented in the integrity process of FIG. 2.

FIG. 3 depicts an example map generation process (hereinafter, "map process") 300 that may be implemented in the integrity process 200 of FIG. 2. The map process 300 is configured to generate the installed hash map 208 from the installed program files 106 and/or the vendor hash map 220 from the integrity files 118. The map process 300 of FIG. 3 may be implemented by the scan module 201, the hash compute module 202, and the read module 218 described with reference to FIG. 2.

In the embodiment of FIG. 3, the map process 300 includes a population process 301 to create the vendor hash map 220 and a generation process 303 to create the installed hash map 208. In other embodiments, the map process 300 may include the population process 301 or the generation process 303. For instance, an alternative map process may include only the population process 301. In these and other embodiments, the installed hash map 208 may not be expressly created. Instead, one or more of the items in the installed hash map 208 may be computed on the fly with necessarily being aggregated into the installed hash map 208. Additionally or alternatively, in some embodiments of the integrity process, the vendor hash map 220 may be generated by a vendor server and communicated throughout a system implementing an integrity analysis.

The population process 301 generally includes population of the vendor hash map 220. In some embodiments, the read module 218 may receive the integrity files 118. The integrity files 118 may include the vendor program files (e.g., the vendor program files 101 of FIGS. 1 and 2) and computed hash values for the vendor program files. The read module 218 may be configured open the integrity files 118 and generate one or more directories of the information included therein. For instance, in the vendor hash map 220, a first list or directory may include file names of the vendor program files of the integrity files 118. Specifically, in FIG. 3, the vendor hash map 220 may include a first column (on the left of FIG. 3). The first column includes a list of vendor program files 306 from the integrity files 118, which are identified by their file name. For example, the vendor program files 306 include a first vendor program file 306A, a second vendor program file 306B, and a third vendor program file 306C. The vendor program files 306 are substantially equivalent to and may correspond to the vendor program files 101 of FIGS. 1 and 2.

Additionally, in the population process 301, vendor hash values 308 may be populated to the vendor hash map 220. For instance, the integrity files 118 may include the vendor hash values 308. Thus, the read module 218 may then simply add the vendor hash values 308 to the vendor hash map 220. Alternatively, the read module 218 may implement a hash operation to compute the vendor hash values 308 based on the vendor program files 306. In the example of FIG. 3, the vendor hash values 308 include a first vendor hash value 308A, a second vendor hash value 308B, and a third vendor hash value 308C. In other embodiments, a number of vendor program files 306 and vendor hash values 308 may correspond to a number of program files associated with an application. In most applications the number of vendor program files 306 and vendor hash values 308 will be more than three.

The generation process 303 includes generation of the installed hash map 208. In some embodiments, the scan module 201 conducts a scan of a system such as the network appliance 108 to identify the installed program files 106. The scan module 201 may be configured access information related to the installed program files 106 and generate a directory or list of the information based on the accessed information. For instance, in the installed hash map 208, a first list or directory may include file names of the installed program files 106 on the network appliance. Specifically, in FIG. 3, the installed hash map 208 may include a first column (on the left of FIG. 3). The first column includes a list of installed program files 302 (which correspond to the installed program files 106) from the network appliance 108. The installed program files 302 are identified in the installed hash map 208 by their file name. For example, the installed program files 302 include a first installed program file 302A, a second installed program file 302B, and a third installed program file 302C. In addition, the scan module 201 may communicate the installed program files 106 to the hash compute module 202.

Additionally, in the generation process 303, installed hash values 304 may be computed by the hash compute module 202. For instance, the hash compute module 202 may implement a hash operation (e.g., SHA-256 or another suitable hash function) to compute the installed hash values 304 based on the installed program files 302. In the example of FIG. 3, the installed hash values 304 include a first installed hash value 304A, a second installed hash value 304B, and a third installed hash value 304C. In other embodiments, a number of installed program files 302 and installed hash values 304 may correspond to a number of installed program files associated with an application and stored on the network appliance. In most applications the number of installed program files 302 and installed hash values 304 will be more than three.

Figure 4:
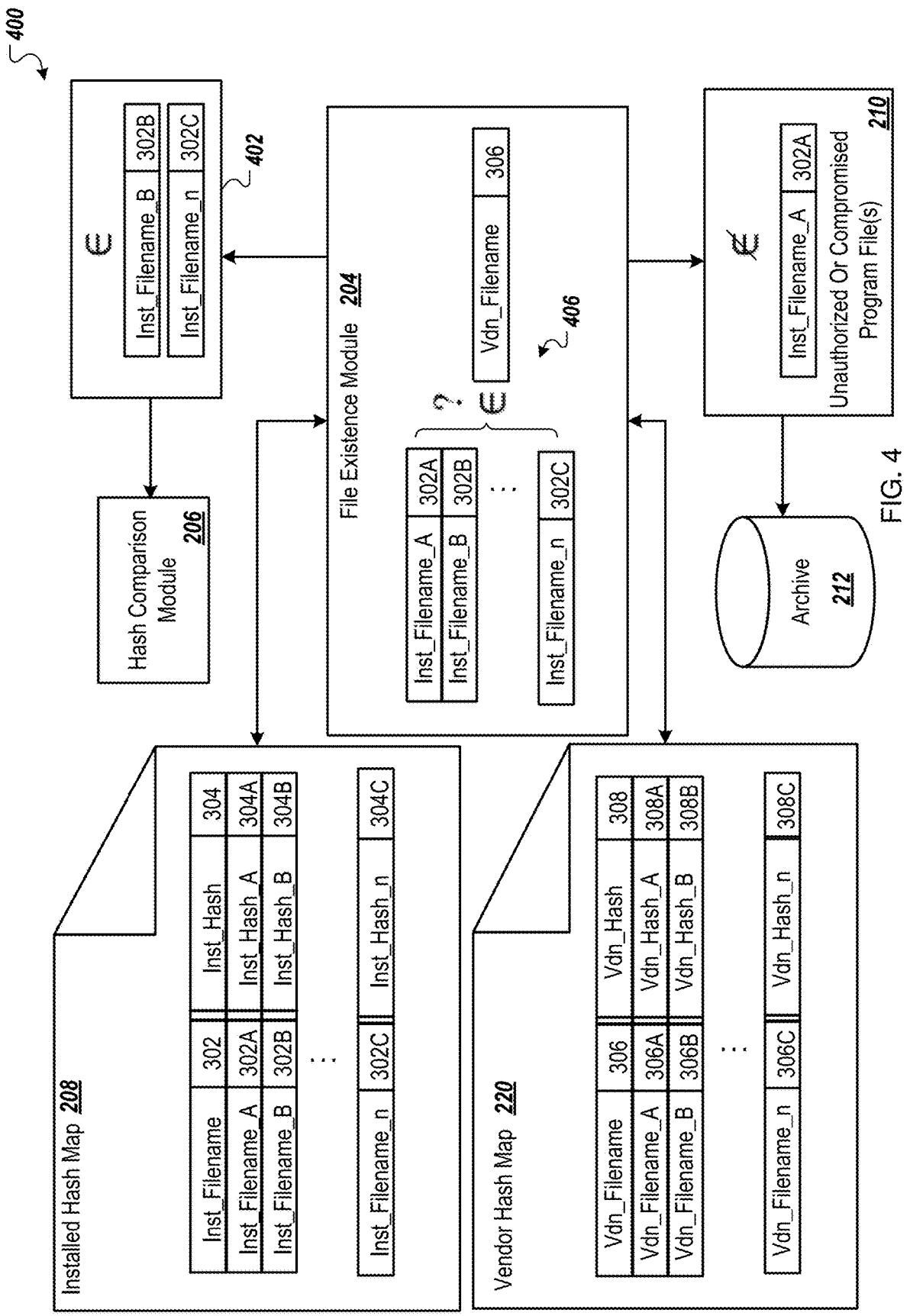
FIG. 4 depicts an example program file existence process that may be implemented in the integrity process of FIG. 2.

FIG. 4 depicts an example program file existence process (hereinafter, "existence process") 400 that may be implemented in the integrity process 200 of FIG. 2. The existence process 400 may be configured to determine whether one or more of the program files in the installed hash map 208 are included in the vendor hash map 220. The existence process 400 may be performed following implementation of operations of the map process 300 of FIG. 3 or a similar process.

In the example of FIG. 4, the installed hash map 208 and the vendor hash map 220 may be accessed by the file existence module 204. In particular, the file existence module 204 may read each of the installed program files 302 from the installed hash map 208. The file existence module 204 may then determine whether the installed program files 302 are included in the vendor program files 306 in the vendor hash map 220. For instance, the file existence module 204 may perform a membership operation, which is represented in FIG. 4 by and membership operator, E with a question mark positioned over it 406.

Responsive to one of the installed program files 302 not existing in the vendor hash map 220, the file existence module 204 may classify the installed program file 302 as an unauthorized program file 210. The unauthorized program files 210 may be communicated to the archive 212. Additionally, the unauthorized program files 210 may be encrypted and communicated to a vendor server such as the vendor server 102.

Responsive to the installed program files 302 existing in the vendor hash map 220, the file existence module 204 may communicate a signal 402 to the hash comparison module 206. The hash comparison module 206 may be configured to perform a hash comparison process. An example of the hash comparison process is provided with reference to FIG. 5. For instance, in FIG. 4, the second installed program file 302B and the third installed program file 302C are members of the vendor hash map 220. Accordingly, the signal 402 sent to the hash comparison module 206 may indicate that the second installed program file 302B and the third installed program file 302C exist in the vendor hash map 220.

Figure 5:
FIG. 5 depicts an example hash comparison process that may be implemented in the integrity process of FIG. 2.

FIG. 5 depicts an example hash comparison process (hereinafter, "hash process") 500 that may be implemented in the integrity process 200 of FIG. 2 or another similar process. The hash process 500 may be configured to compare hash values 304 of program files that have been determined to exist in the vendor hash map 220. For instance, the hash process 500 may be performed following the existence process 400 of FIG. 4 or another similar process.

The hash process 500 of FIG. 5 is performed by the hash comparison module 206. In these and other embodiments, the hash process 500 may include three operations 502, 504, and 506. A first operation 502 may include receiving signals indicative of one or more installed program files that were determined to exist in the vendor hash map 220. In FIG. 5, for example, the second installed program file 302B and the third installed program file 302C were determined to exist in the vendor hash map 220. The hash comparison module 206 may accordingly receive a signal indicative of their existence in the vendor hash map 220.

Additionally, in the first operation 502, a corresponding vendor program file may be identified for the installed program files that exist in the vendor hash map 220. In FIG. 5, for example, the second vendor program file 306B may be identified as corresponding to the second installed program file 302B. Also, in FIG. 5, the third vendor program file 306C may be identified as corresponding to the third installed program file 302C.

In the second operation 504, computed hash values representative of the installed program files 302 and the vendor program files 306 may be identified. In FIG. 5, the second installed hash value 304B is representative of the second installed program file 302B, the third installed hash value 304C is representative of the third installed program file 302C, the second vendor hash value 308B is representative of the second vendor program file 306B, and the third vendor hash value 308C is representative of the third vendor program file 306C.

In the third operation, the computed hash values of the corresponding program files are compared. Comparison of the hash values provides insight into the content of the program files represented by the hash values. For example, when the computed hash values are equivalent, contents of the program files are also equivalent. Similarly, when the computed hash values are mismatched, the contents of the program files are not equivalent, which indicates the installed program files have been modified. In FIG. 5, for example, the second installed hash value 304B is compared to the second vendor hash value 308B. Also, the third installed hash value 304C is compared to the third vendor hash value 308C.

Responsive to the hash values being equivalent, the hash process 500 may proceed to either verify the installed program file 302 or classify the installed program file 302 as a compromised program file 210. The compromised program files 210 may be archived and encrypted. Additionally, the compromised program files 210 may also be communicated to a vendor server for analysis.

In FIG. 5, for example, the third installed hash value 304C may be equivalent to the third vendor hash value 308C. Accordingly, the third installed program file 302C may be verified (as shown in block 508). In contrast, the second installed hash value 304B may differ from the third vendor hash value 308C. Accordingly, the second installed program file 302B is classified as a compromised program file 210 and communicated to the archive 212.

Figure 6:
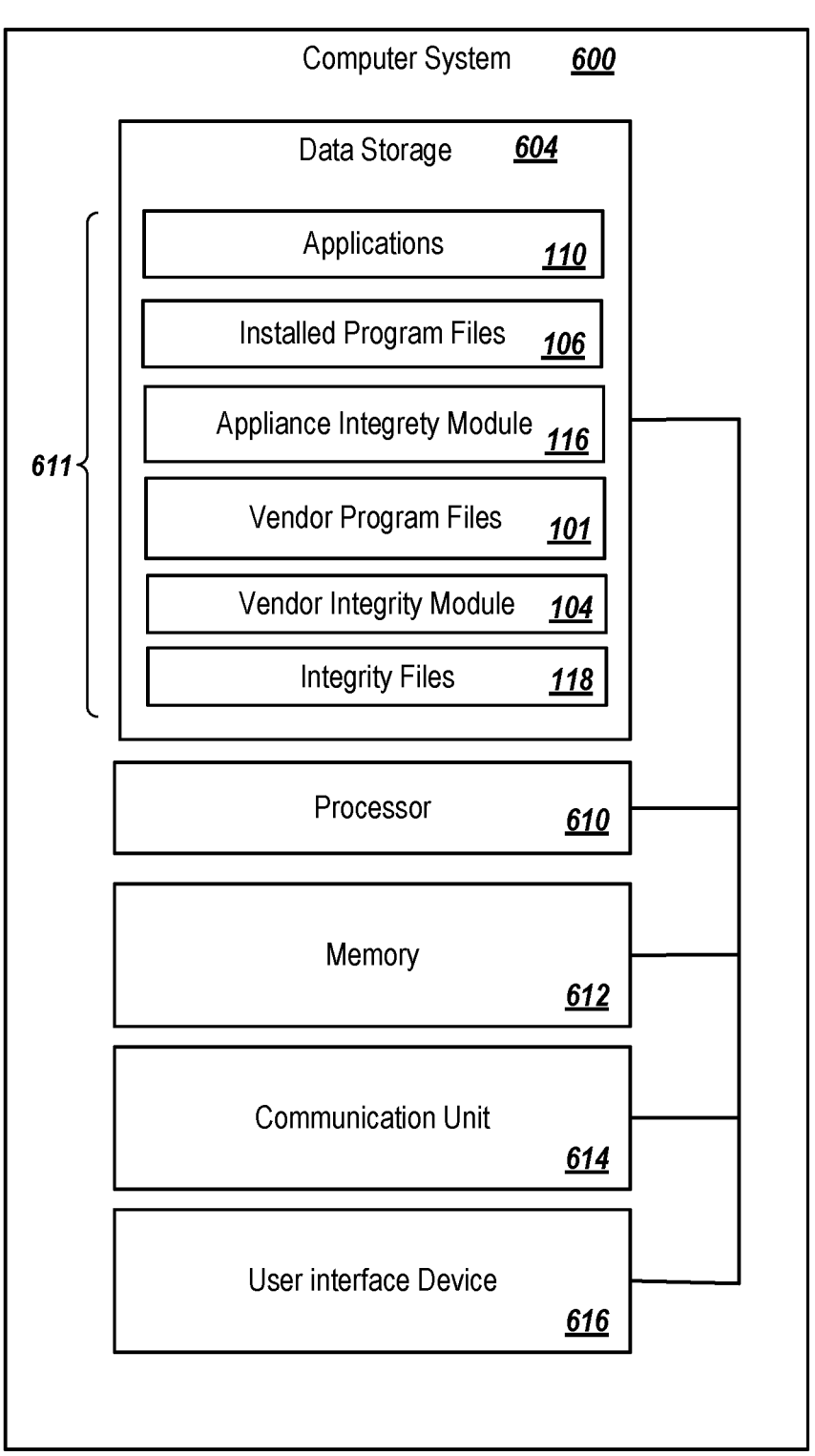
FIG. 6 illustrates an example computer system configured for software application integrity verification.

FIG. 6 illustrates an example computer system 600 configured for software application integrity verification, according to at least one embodiment of the present disclosure. The computer system 600 may be implemented in the operating environment 100 of FIG. 1, for instance. Examples of the computer system 600 may include the network appliance 108, the vendor server 102, the network server 136, or some combination thereof. The computer system 600 may include one or more processors 610, a memory 612, a communication unit 614, a user interface device 616, and a data storage 604 that includes the applications 110, the installed program files 106, the appliance integrity module 116, the vendor program files 101, the vendor integrity module 104, and the integrity files 118 (collectively, modules 611).

The processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 6, the processor 610 may more generally include two or more processors configured to perform individually or collectively any number of operations described in the present disclosure. Additionally, one or more of the processors 610 may be present on one or more different electronic devices or computing systems. In some embodiments, the processor 610 may interpret and/or execute program instructions and/or process data stored in the memory 612, the data storage 604, or the memory 612 and the data storage 604. In some embodiments, the processor 610 may fetch program instructions from the data storage 604 and load the program instructions in the memory 612. After the program instructions are loaded into memory 612, the processor 610 may execute the program instructions.

The memory 612 and the data storage 604 may include computer-readable storage media for carrying or having computer-executable instructions or data structures stored thereon. Such computer-readable storage media may include any available media that may be accessed by a general-purpose or special-purpose computer, such as the processor 610. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 614 may include one or more pieces of hardware configured to receive and send communications. In some embodiments, the communication unit 614 may include one or more of an antenna, a wired port, and modulation/demodulation hardware, among other communication hardware devices. In particular, the communication unit 614 may be configured to receive a communication from outside the computer system 600 and to present the communication to the processor 610 or to send a communication from the processor 610 to another device or network (e.g., the network 119 of FIG. 1).

The user interface device 616 may include one or more pieces of hardware configured to receive input from and/or provide output to a user. In some embodiments, the user interface device 616 may include one or more of a speaker, a microphone, a display, a keyboard, a touch screen, or a holographic projection, among other hardware devices.

The modules 611 may include program instructions stored in the data storage 604. The processor 610 may be configured to load the modules 611 into the memory 612 and execute the modules 611. Alternatively, the processor 610 may execute the modules 611 line-by-line from the data storage 604 without loading them into the memory 612. When executing the modules 611, the processor 610 may be configured to perform one or more processes or operations described elsewhere in this disclosure.

Modifications, additions, or omissions may be made to the computer system 600 without departing from the scope of the present disclosure. For example, in some embodiments, the computer system 600 may not include the user interface device 616. In some embodiments, the different components of the computer system 600 may be physically separate and may be communicatively coupled via any suitable mechanism. For example, the data storage 604 may be part of a storage device that is separate from a device, which includes the processor 610, the memory 612, and the communication unit 614, that is communicatively coupled to the storage device. The embodiments described herein may include the use of a special-purpose or general-purpose computer including various computer hardware or software modules, as discussed in greater detail below.

Figure 7A:
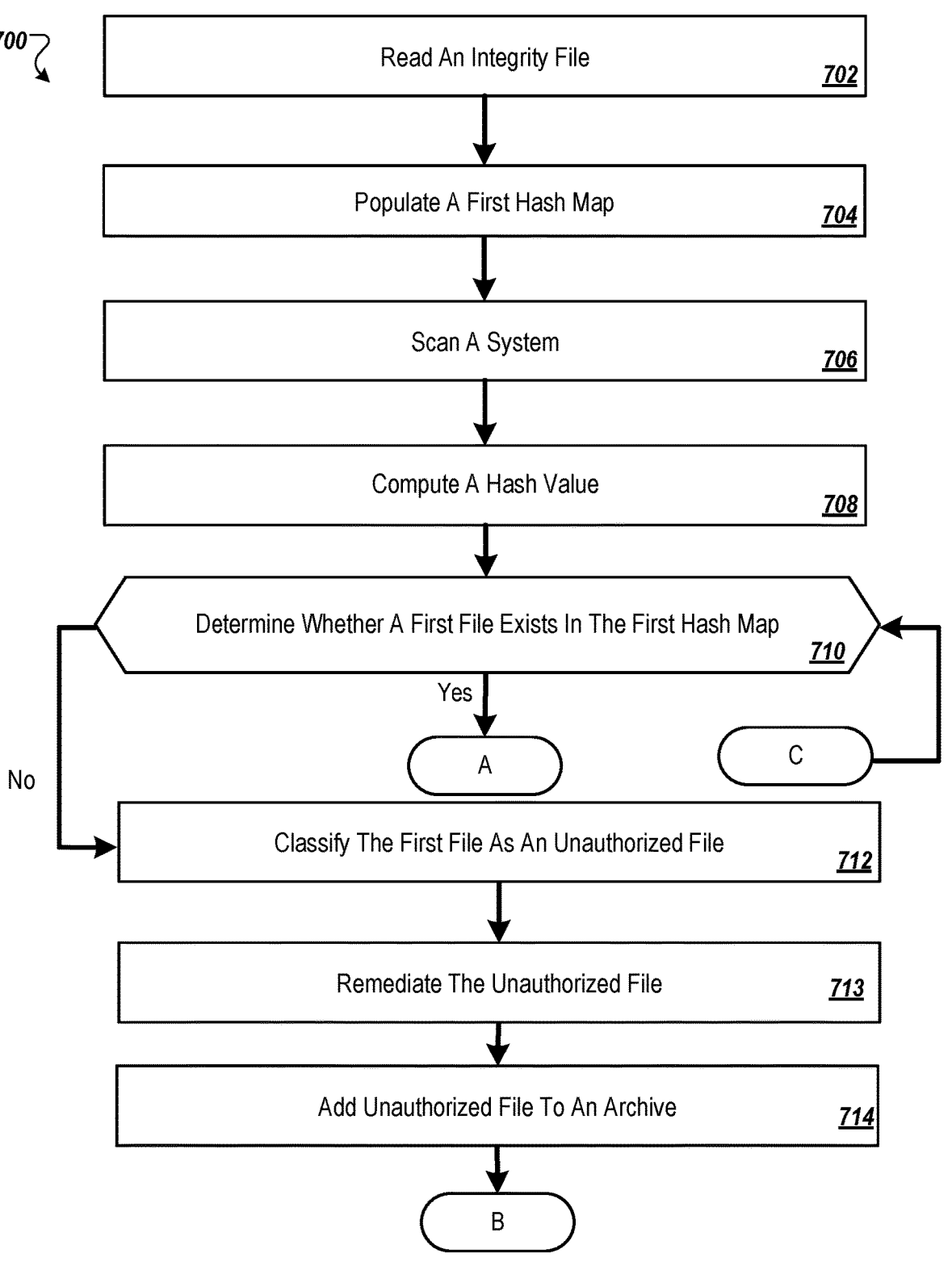
FIGS. 7A and 7B are a flow chart of an example method of software application integrity verification, all according to at least one embodiment described in the present disclosure.
Figure 7B:
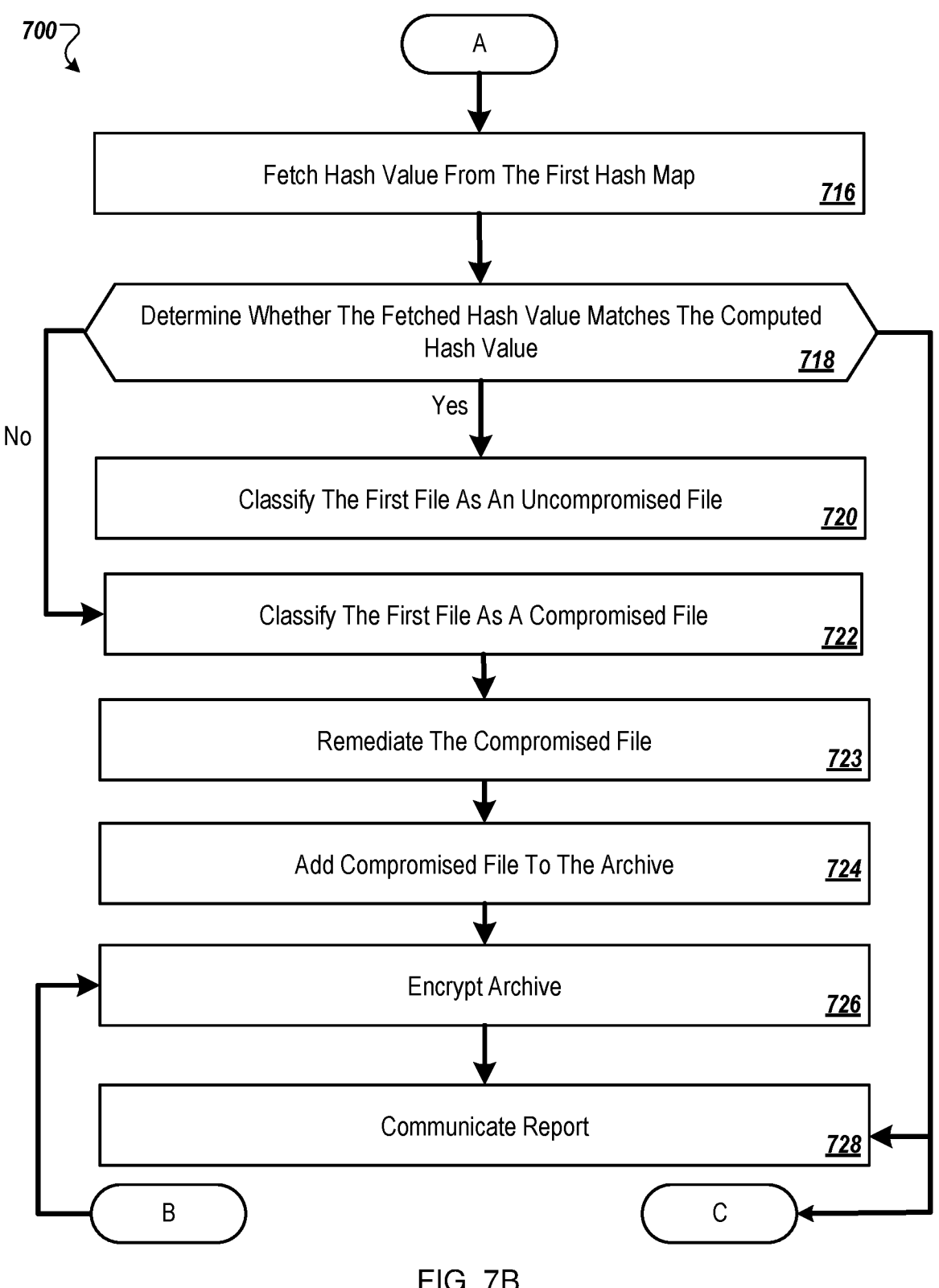

FIGS. 7A and 7B are a flow chart of an example method 700 of software application integrity verification, according to at least one embodiment described in the present disclosure. The method 700 may be performed in a suitable operating environment such as the operating environment 100. The method 700 may be performed by the network appliance 108 or the vendor server 102 described elsewhere in the present disclosure or by another suitable computing system, such as the computing system 600 of FIG. 6. The network appliance 108 or the vendor server 102 implementing or controlling operation of the method 700 may be included in a cloud-based networked system, a managed network, managed subnetwork, or another suitable network computing environment. Although illustrated as discrete blocks, one or more blocks in FIGS. 7A and 7B may be divided into additional blocks, combined into fewer blocks, or eliminated, depending on the desired implementation.

Referring to FIG. 7A, the method 700 may begin at block 702 in which an integrity file may be read. The integrity file may include vendor program files for an application under analysis. At block 704, a first hash map may be populated. For instance, the first hash map may be a vendor hash map that includes information such as a list or directory of each of the files of the vendor program files. Additionally, the first hash map may include hash values of each of the vendor program files.

At block 706, a system may be scanned. The system is scanned to identify installed program files on the system that are associated with the application under analysis. In some embodiments the system may include a network appliance or another computing device on which the application under analysis is located. At block 708, a hash value may be computed. For instance, the hash value of one or more of the installed program files may be computed.

At block 710, it may be determined whether a first file exists in the first hash map. For instance, it may be determined whether a first installed program file identified on the system during the scan operation exists in the first hash map. Responsive to the file existing in the first hash ("YES" at block 710), the method 700 may proceed to block 716. Responsive to the file not existing in the first hash ("NO" at block 710), the method 700 may proceed to block 712.

At block 712, the first file may be classified as an unauthorized file. For instance, the first hash map includes all of the files that should be present in installed program files. Thus, if the first file of the installed program files does not exist in the first hash map, which indicates that the first file may have been added to the system by a malicious actor.

At block 713, the unauthorized file may be remediated. For instance, responsive to detection of the unauthorized file, the vendor server may communicate the complaint program files to the system to replace the installed program files or to perform a factory reset of the application. Installation of the compliant program files reduces or removes the vulnerability introduced by the unauthorized file.

At block 714, the unauthorized file may be added to an archive. In some embodiments, an artifact of the unauthorized file may be created, which may be added to the archive. The method 700 may proceed from block 714 to block 726 of FIG. 7B. At block 726, the archive may be encrypted, which may enable specific analysis as to the source, threat level, origin, etc. of the content of the archive (including the unauthorized file and compromised file).

At block 728, a report may be communicated. For instance, responsive to an unauthorized file being present on the system or presence of a compromised file on the system, a report may be generated and communicated to a supervisory or management entity. The report may include information from the archive as well as information related to the system, for example.

With continued reference to FIG. 7B, at block 716 a hash value may be fetched from the first hash map. Accordingly, if the first file exists in the first hash map, an operation is performed to fetch a hash value of a corresponding program file of the first hash map. For instance, if it is determined that a first installed program file exists in the first hash map, then the hash value of the first vendor program file is fetched. That is, the first installed program file corresponds to the first vendor program file in the first hash map, then the hash value of the first vendor program file is fetched.

At block 718, it may be determined whether the fetched hash value matches the computed hash value. For instance, it may be determined whether the fetched hash value for a first vendor program file matches the computed hash value for the first installed program file that corresponds to the first vendor program file. Responsive to the fetched hash value matching the computed hash value, ("YES" at block 718), the method 700 may proceed to block 720. Responsive to the fetched hash value differing from the computed hash value ("NO" at block 718), the method 700 may proceed to block 722.

At block 722, the first file may be classified as a compromised file. For instance, when the computed hash value differs from the fetched hash value, it indicates that the contents of installed program file (e.g., the first file) has been modified. Modification to the installed program file may indicate that a malicious actor has exploited a vulnerability on the system, which may indicate security breach in the system or a network including the system.

At block 723, the compromised file may be remediated. For instance, responsive to detection of the compromised file, the vendor server may communicate the complaint program files to the system to replace the installed program files or to perform a factory reset of the application. Installation of the compliant program files reduces or removes the vulnerability introduced by the compromised file. At block 724, the compromised file may be added to the archive. As discussed above, the archive may be encrypted at block 726 and a report may be communicated in block 728.

At block 720, the first file may be classified as an uncompromised or verified file. For instance, when the computed hash value matches the fetched hash value, it indicates that the contents of program files are equivalent and unmodified by a malicious actor. Thus, these program files may pose little risk at introducing a security vulnerability to the system. Classification of the first file as the uncompromised or verified file may indicate that the trustworthiness and authenticity of the first file may be verified. The method 700 may proceed to block 728 described above. The report regarding the uncompromised file may indicate a verification of the first file. Additionally, in some embodiments, the method 700 may proceed to block 710 where one or more additional files from the installed program files are evaluated using one or more of blocks 712, 714, 716, 718, 720, 722, 724, 726, 728, or some combination thereof.

In some embodiments, the method 700 may also include an operation that ensures each of the program files in the first hash map are included in the installed program files of the system. In these and other embodiments, as the installed program files are evaluated, the corresponding vendor program file may be noted. After all the installed program files on the system are evaluated, the method 700 may include an operation that determines whether there is any left of vendor program files in the first hash map. Responsive to one of the installed program files being missing from the system, the method 700 may include remediating the system by performing a factory reset or adding the missing program file to the system.

Additionally, in some embodiments, the method 700 may be performed during a secured boot or while the application under analysis is operational.

Further, modifications, additions, or omissions may be made to the method 700 without departing from the scope of the present disclosure. For example, the operations of method 700 may be implemented in differing order. Furthermore, the outlined operations and actions are only provided as examples, and some of the operations and actions may be optional, combined into fewer operations and actions, or expanded into additional operations and actions without detracting from the disclosed embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of software application integrity verification and remediation, the method comprising:

performing an out-of-band scan of the network appliance to identify installed program files at the network appliance, wherein the out-of-band scan is performed without interfering with normal operation of applications on the network appliance and while the applications are running on the network appliance, the installed program files correspond to the applications, and the installed program files are associated with a vendor-supplied software application under analysis that is deployed at the network appliance;

computing a hash value of a first installed program file of the installed program files, wherein the computed hash value is a representation of content of the first installed program file;

determining whether the first installed program file exists in vendor program files of the vendor-supplied software application under analysis, the vendor program files being maintained separate from the installed program files;

responsive to a determination that the first installed program file exists in the vendor program files:

fetching a hash value of a first vendor program file of the vendor program files, wherein the first vendor program file corresponds to the first installed program file, and the fetched hash value is a representation of content of the first vendor program file;

determining whether the fetched hash value matches the computed hash value, wherein a difference between the fetched hash value and the computed hash value is an indication of an unauthorized modification to the first installed program file; and responsive to the fetched hash value differing from the computed hash value:

classifying the first installed program file as a compromised file; and remediating the compromised file at the network appliance, wherein the remediating the compromised file includes:

performing a factory reset of the vendor-supplied software application under analysis;

generating an artifact of the first installed program file;

adding the artifact of the first installed program file to an archive; and encrypting the archive to prevent further access to the first installed program file to preserve the first installed program file such that a difference in content of the first installed program file relative to the first vendor program file is able to be analyzed.

2. The method of claim 1, further comprising responsive to a determination that the first installed program file does not exist in the vendor program files:

classifying the first installed program file as an unauthorized file; and remediating the unauthorized file at the network appliance.

3. The method of claim 2, further comprising responsive to the fetched hash value matching the computed hash value, classifying the first installed program file as a verified program file at the network appliance.

4. The method of claim 1, further comprising:

reading an integrity file that includes the vendor program files associated with the vendor-supplied software application; and populating a first hash map based on the integrity file, the first hash map including a list of the vendor program files and hash values of the vendor program files.

5. The method of claim 4, wherein:

the determining whether the first installed program file exists in vendor program files includes determining whether the first installed program file exists in the first hash map;

the hash value is fetched from the first hash map; and the first hash map is formatted according to a bill of materials (BOM) file format.

6. The method of claim 1, wherein the scanning the network appliance is performed responsive to a clock signal.

7. The method of claim 1, wherein the vendor-supplied software application under analysis includes:

an encrypted application running in a client environment; or a Linux-based application.

8. The method of claim 1, wherein the applications are running such that a malicious actor does not know that the integrity verification and remediation operations are underway.

9. A non-transitory computer-readable medium having encoded therein programming code executable by one or more processors to perform or control performance of operations of software application integrity verification and remediation, the operations comprising:

performing an out-of-band scan of the network appliance to identify installed program files at the network appliance, wherein the out-of-band scan is performed without interfering with normal operation of applications on the network appliance and while the applications are running on the network appliance, the installed program files correspond to the applications, and the installed program files are associated with a vendor-supplied software application under analysis that is deployed at the network appliance;

computing a hash value of a first installed program file of the installed program files, wherein the computed hash value is a representation of content of the first installed program file;

determining whether the first installed program file exists in vendor program files of the vendor-supplied software application under analysis, the vendor program files being maintained separate from the installed program files;

responsive to a determination that the first installed program file exists in the vendor program files:

fetching a hash value of a first vendor program file of the vendor program files, wherein the first vendor program file corresponds to the first installed program file, and the fetched hash value is a representation of content of the first vendor program file;

determining whether the fetched hash value matches the computed hash value, wherein a difference between the fetched hash value and the computed hash value is an indication of an unauthorized modification to the first installed program file; and responsive to the fetched hash value differing from the computed hash value:

classifying the first installed program file as a compromised file; and remediating the compromised file at the network appliance, wherein the remediating the compromised file includes:

performing a factory reset of the vendor-supplied software application under analysis;

generating an artifact of the first installed program file;

adding the artifact of the first installed program file to an archive; and encrypting the archive to prevent further access to the first installed program file to preserve the first installed program file such that a difference in content of the first installed program file relative to the first vendor program file is able to be analyzed.

10. The non-transitory computer-readable medium of claim 9, wherein the operations further comprise responsive to a determination that the first installed program file does not exist in the vendor program files:

classifying the first installed program file as an unauthorized file; and remediating the unauthorized file at the network appliance.

11. The non-transitory computer-readable medium of claim 10, wherein the operations further comprise responsive to the fetched hash value matching the computed hash value, classifying the first installed program file as a verified program file at the network appliance.

12. The non-transitory computer-readable medium of claim 9, wherein the operations further comprise:

reading an integrity file that includes the vendor program files associated with the vendor-supplied software application; and populating a first hash map based on the integrity file, the first hash map including a list of the vendor program files and hash values of the vendor program files.

13. The non-transitory computer-readable medium of claim 12, wherein:

the determining whether the first installed program file exists in vendor program files includes determining whether the first installed program file exists in the first hash map;

the hash value is fetched from the first hash map; and the first hash map is formatted according to a bill of materials (BOM) file format.

14. The non-transitory computer-readable medium of claim 9, wherein the scanning the network appliance is performed responsive to a clock signal.

15. The non-transitory computer-readable medium of claim 9, wherein the vendor-supplied software application under analysis includes:

an encrypted application running in a client environment; or a Linux-based application.

16. The non-transitory computer-readable medium of claim 9, wherein the applications are running such that a malicious actor does not know that the integrity verification and remediation operations are underway.

* * * * *